US012658733B2

(12) United States Patent
Feng et al.

(10) Patent No.: US 12,658,733 B2
(45) Date of Patent: Jun. 16, 2026

(54) WIRELESS CHARGING TRANSMITTING APPARATUS, WIRELESS CHARGING RECEIVING APPARATUS, AND SYSTEM THEREOF

(71) Applicant: HUAWEI TECHNOLOGIES CO., LTD., Shenzhen (CN)

(72) Inventors: Shaojie Feng, Dongguan (CN); Zhongnan Qian, Dongguan (CN); Yongfa Zhu, Dongguan (CN); Xiaowei Chen, Dongguan (CN); Quanhao Sun, Dongguan (CN); Zhiqiang Duan, Shanghai (CN); Jiangtao Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 18/758,006

(22) Filed: Jun. 28, 2024

(65) Prior Publication Data

US 2024/0356381 A1      Oct. 24, 2024

Related U.S. Application Data

(63) Continuation of application No. PCT/CN2022/138653, filed on Dec. 13, 2022.

(30) Foreign Application Priority Data

Dec. 31, 2021      (CN) .......................... 202111678968.6

(51) Int. Cl.
*H02J 50/05*          (2016.01)
*H02J 50/00*          (2016.01)
(Continued)

(52) U.S. Cl.
CPC ............ *H02J 50/05* (2016.02); *H02J 50/005* (2020.01); *H02J 50/402* (2020.01); *H02J 50/70* (2016.02); *H02J 7/731* (2026.01); *H02J 50/10* (2016.02)

(58) Field of Classification Search
CPC .... H02J 50/05; H02J 50/10–12; H02J 50/402; H02J 50/70
See application file for complete search history.

(56)                References Cited

U.S. PATENT DOCUMENTS

2012/0146574 A1*   6/2012   Ichikawa ................ H02J 50/05
                                                              307/149
2013/0234533 A1*   9/2013   Kato ....................... H02J 50/90
                                                              307/104
(Continued)

FOREIGN PATENT DOCUMENTS

CN          102510118 A      6/2012
CN          106300448 A      1/2017
(Continued)

OTHER PUBLICATIONS

English machine translation of WO2021/080009A1 published Apr. 29, 2021 (Year: 2021).*

(Continued)

*Primary Examiner* — Rexford N Barnie
*Assistant Examiner* — David A Shiao

(57)                ABSTRACT

A wireless charging transmitting apparatus includes an inverter circuit, a first transmitting plate, and a second transmitting plate. The wireless charging receiving apparatus includes a first receiving plate, a second receiving plate, and a rectifier circuit. An input end of the inverter circuit is connectable to a direct current power supply, a first output end of the inverter circuit is connected to the first transmitting plate, and a second output end of the inverter circuit is connected to the second transmitting plate. A first contact is (Continued)

disposed on the first transmitting plate, and a second contact is disposed on the first receiving plate. At least part of coupling between the transmitting apparatus and receiving apparatus is alternately contactless or via electrical contact.

18 Claims, 12 Drawing Sheets

(51) Int. Cl.

| | | |
|---|---|---|
| *H02J 50/40* | (2016.01) | |
| *H02J 50/70* | (2016.01) | |
| *H02J 7/70* | (2026.01) | |
| *H02J 50/10* | (2016.01) | |

(56) References Cited

U.S. PATENT DOCUMENTS

| | | | | |
|---|---|---|---|---|
| 2014/0152122 A1* | 6/2014 | Ichikawa | ............... | H02J 50/05 |
| | | | | 307/149 |
| 2014/0175907 A1* | 6/2014 | Takahashi | ............ | H02J 50/005 |
| | | | | 307/149 |
| 2014/0292103 A1* | 10/2014 | Waffenschmidt | ........ | H04B 5/22 |
| | | | | 307/109 |
| 2014/0354084 A1* | 12/2014 | Takahashi | ............... | H02J 50/70 |
| | | | | 307/149 |
| 2015/0249358 A1 | 9/2015 | Calkins et al. | | |
| 2016/0043575 A1* | 2/2016 | Ichikawa | ............. | H02J 50/402 |
| | | | | 307/104 |

| | | | | |
|---|---|---|---|---|
| 2016/0204659 A1* | 7/2016 | Tamino | ................. | H02J 50/005 |
| | | | | 307/104 |
| 2020/0287413 A1 | 9/2020 | Peretz | | |
| 2022/0216734 A1* | 7/2022 | Feng | ....................... | H02J 50/40 |

FOREIGN PATENT DOCUMENTS

| | | | | |
|---|---|---|---|---|
| CN | 106899040 A | 6/2017 | | |
| CN | 107872102 A | 4/2018 | | |
| CN | 109941128 A | 6/2019 | | |
| CN | 110022008 A | 7/2019 | | |
| CN | 110707827 A | 1/2020 | | |
| CN | 110867913 A | 3/2020 | | |
| CN | 111114350 A | 5/2020 | | |
| CN | 111224471 A | 6/2020 | | |
| CN | 111987780 A | 11/2020 | | |
| CN | 212520950 U | 2/2021 | | |
| CN | 112564295 A | 3/2021 | | |
| CN | 112622654 A | 4/2021 | | |
| CN | 112713634 A | 4/2021 | | |
| CN | 112721667 A | 4/2021 | | |
| CN | 112721671 A | 4/2021 | | |
| TW | 201724689 A | 7/2017 | | |
| WO | WO-2021080009 A1 * | 4/2021 | ............. | H02J 50/40 |

OTHER PUBLICATIONS

International Search Report and Written Opinion issued in PCT/CN2022/138653, dated Mar. 7, 2023, 7 pages.

* cited by examiner

Second transmitting plate

First transmitting plate

Inverter circuit

First compensation circuit

Wireless charging transmitting apparatus

Electrode block B

Comb structure

First
transmitting
plate

Second
transmitting
plate

Shield
layer

Second
receiving
plate

First
receiving
plate

Second
receiving
plate

First
receiving
plate

Watch face
of a watch

Second
receiving plate

Bottom cover
of the watch

First receiving
plate

First flexible circuit board

First transmitting sub-plate

Second flexible circuit board

Second transmitting sub-plate

Shield plate

Third flexible circuit board

WIRELESS CHARGING TRANSMITTING APPARATUS, WIRELESS CHARGING RECEIVING APPARATUS, AND SYSTEM THEREOF

CROSS-REFERENCE TO RELATED APPLICATIONS

This application is a continuation of International Application No. PCT/CN2022/138653, filed on Dec. 13, 2022, which claims priority to Chinese Patent Application No. 202111678968.6, filed on Dec. 31, 2021. The disclosures of the aforementioned applications are hereby incorporated by reference in their entireties.

TECHNICAL FIELD

This application relates to the field of wireless charging technologies, and in particular, to a wireless charging transmitting apparatus, a wireless charging receiving apparatus, and a system thereof.

BACKGROUND

Currently, charging an electronic device by using a wireless charging technology is increasingly popular. Compared with conventional cable charging, no cable connection is needed between a power supply and a load in wireless charging. Therefore, wireless charging is more secure, convenient, and reliable.

In the conventional technology, for a system block diagram of a wireless charging system, refer to FIG. 1. As shown in FIG. 1, the wireless charging system includes a transmitting apparatus and a receiving apparatus. The transmitting apparatus may include two transmitting plates, and the receiving apparatus may include two receiving plates. The two transmitting plates exactly face the two receiving plates, to form two pairs of coupling capacitors to transmit electric energy. However, in this design of the opposite plates, if there is a case of deviation between the two transmitting plates and the two receiving plates, in other words, the two transmitting plates and the two receiving plates do not exactly face each other, the wireless charging system is detuned, and charging efficiency of the system is affected. In other words, a plate design of the wireless charging system in the conventional technology causes a poor deviation capability and a low degree of freedom of wireless charging.

SUMMARY

This application provides a wireless charging transmitting apparatus, a wireless charging receiving apparatus, and a system thereof, to implement energy transmission in a large range, and improve a deviation capability of wireless charging.

According to a first aspect, an embodiment of this application provides a wireless charging transmitting apparatus. The wireless charging transmitting apparatus includes an inverter circuit, a first transmitting plate, and a second transmitting plate; an input end of the inverter circuit is connected to a direct current power supply, a first output end of the inverter circuit is connected to the first transmitting plate, and a second output end of the inverter circuit is connected to the second transmitting plate; and a first contact is disposed on the first transmitting plate, and when the first contact can be in contact with a second contact on a first receiving plate in a wireless charging receiving apparatus, the first transmitting plate establishes an electrical connection to the first receiving plate. However, the first transmitting plate and the second transmitting plate are not in contact with each other, and the second transmitting plate performs electric field coupling with the second receiving plate in the wireless charging receiving apparatus through air. In this embodiment of this application, the first contact is added to the first transmitting plate of the wireless charging transmitting apparatus, and an electrical connection is established between the first contact and the second contact of the first receiving plate of the wireless charging receiving apparatus, so that electric field coupling is performed between the second transmitting plate and the second receiving plate. The wireless charging transmitting apparatus has high tolerance for a shape of the receiving plate, and can be compatible with receiving plates of different forms. In addition, a contact area between the first contact and the second contact is not limited. Therefore, in this embodiment of this application, energy transmission can be implemented in a large range, thereby improving a deviation capability of wireless charging.

With reference to the first aspect, in a first possible implementation, when the first contact is not in contact with the second contact on the first receiving plate, the first transmitting plate performs electric field coupling with the first receiving plate through air. In other words, in this embodiment of this application, a contact wireless charging receiving apparatus and a non-contact wireless charging receiving apparatus may be compatible, and compatibility is high.

With reference to the first aspect or with reference to the first possible implementation of the first aspect, in a second possible implementation, a projection of the first transmitting plate in the wireless charging transmitting apparatus in a first direction partially overlaps a projection of the second transmitting plate in the first direction; and the first direction is perpendicular to a plane on which the first transmitting plate is located or is perpendicular to a plane on which the second transmitting plate is located. Different from a structure in which transmitting plates are disposed in parallel in the conventional technology, in this embodiment of this application, a transmitting plate stacking manner is used, so that a surface area of the wireless charging transmitting apparatus is small.

With reference to the second possible implementation of the first aspect, in a third possible implementation, the first transmitting plate is of a mesh structure. In this embodiment of this application, the first transmitting plate is set as the mesh structure, so that blocking of the second transmitting plate by the first transmitting plate can be reduced, and an overlapping area between the second transmitting plate and the second receiving plate is increased, thereby improving transmission efficiency of the wireless charging system.

With reference to the third possible implementation of the first aspect, in a fourth possible implementation, the mesh structure includes a plurality of hollow holes and a plurality of conducting wires between the plurality of hollow holes, and no closed loop is formed between the plurality of conducting wires. In this embodiment of this application, an eddy current loop on the first transmitting plate can be reduced, so that no eddy current temperature rise occurs on the first transmitting plate, thereby reducing an eddy current loss on the first transmitting plate, and further improving transmission efficiency of wireless charging.

With reference to the fourth possible implementation of the first aspect, in a fifth possible implementation, the second transmitting plate includes a plurality of electrode blocks that communicate with each other, and each electrode block performs electric field coupling with the second receiving plate in the wireless charging receiving apparatus through air; and each electrode block corresponds to a hollow hole on the first transmitting plate, and each electrode block is accommodated in a projection that is of a hollow hole corresponding to the electrode block and that is on the second transmitting plate. In this embodiment of this application, an overlapping area between the first transmitting plate and the second transmitting plate can be reduced, so that self-coupling between the first transmitting plate and the second transmitting plate can be reduced, thereby further improving transmission efficiency of the wireless charging system.

With reference to the fifth possible implementation of the first aspect, in a sixth possible implementation, the electrode block is of a comb structure. In this embodiment of this application, an eddy current loop on the second transmitting plate can be reduced, so that no eddy current temperature rise occurs on the second transmitting plate, thereby reducing an eddy current loss on the second transmitting plate, and further improving transmission efficiency of wireless charging. With reference to the second possible implementation of the first aspect to the sixth possible implementation of the first aspect, in a seventh possible implementation, the wireless charging transmitting apparatus further includes a shield layer; and the shield layer is disposed in a projection region of the second transmitting plate in a second direction, where the second direction is opposite to a third direction, and the third direction is a direction in which the second transmitting plate is projected to the second receiving plate. In this embodiment of this application, the shield layer is added to the wireless charging transmitting apparatus, so that electric field leakage of the wireless charging transmitting apparatus can be reduced, and security and reliability of wireless charging can be improved.

With reference to the seventh possible implementation of the first aspect, in an eighth possible implementation, the shield layer is of a mesh structure, and the shield layer is connected to the first output end of the inverter circuit or the second output end of the inverter circuit. In this embodiment of this application, the shield layer is set to the mesh structure, so that self-coupling between the first transmitting plate and the second transmitting plate can be reduced.

With reference to the first aspect or with reference to any one of the foregoing possible implementations of the first aspect, in a ninth possible implementation, the first transmitting plate includes n first transmitting sub-plates, any first transmitting sub-plate is connected to another adjacent first transmitting sub-plate through a first flexible circuit board, and n is not less than 2.

The second transmitting plate includes second transmitting sub-plates corresponding to the first transmitting sub-plates, and any second transmitting sub-plate is connected to another adjacent second transmitting sub-plate through a second flexible circuit board. In this embodiment of this application, the flexible circuit board is used to connect adjacent parts of the plate, so that a wireless charging pad can be folded, an area of a wireless transmitting end is reduced, and portability is good.

With reference to the ninth possible implementation of the first aspect, in a tenth possible implementation, the wireless charging transmitting apparatus further includes a shield layer, the shield layer includes shield plates corresponding to the second transmitting sub-plates, and any shield plate is connected to another adjacent shield plate through a third flexible circuit.

With reference to the tenth possible implementation of the first aspect, in an eleventh possible implementation, the wireless charging transmitting apparatus further includes a transmitting coil, and the transmitting coil is located between the shield layer and the first transmitting plate; and the transmitting coil generates a high-frequency magnetic field under an action of an alternating current, and the high-frequency magnetic field is used to enable a receiving coil in the wireless charging receiving apparatus to generate electric energy. In this embodiment of this application, the transmitting coil is added, so that the wireless charging transmitting apparatus can be compatible with two wireless charging manners: magnetic field coupling and electric field coupling, and applicability is good.

With reference to the eleventh possible implementation of the first aspect, in a twelfth possible implementation, two ends of the transmitting coil are connected between the first output end of the inverter circuit and the second output end of the inverter circuit, and the alternating current is provided by the inverter circuit; or the wireless charging transmitting apparatus further includes a magnetic field transmitting circuit, two ends of the magnetic field transmitting circuit are connected to two ends of the transmitting coil, and the alternating current is provided by the magnetic field transmitting circuit. In other words, the transmitting coil may share the inverter circuit with the two transmitting plates to obtain the alternating current, or another magnetic field transmitting circuit may supply the alternating current to the transmitting coil.

With reference to the first aspect or any one of the foregoing possible implementations of the first aspect, in a thirteenth possible implementation, when the first contact does not establish an electrical connection to the second contact on the first receiving plate of the wireless charging receiving apparatus, the first transmitting plate may further perform electric field coupling with the first receiving plate of the wireless charging receiving apparatus through air.

With reference to the first aspect or any one of the foregoing possible implementations of the first aspect, in a twelfth possible implementation, the wireless charging transmitting apparatus further includes a first compensation circuit, where the first compensation circuit is connected between the inverter circuit, and the first transmitting plate and the second transmitting plate, and the first compensation circuit is configured to compensate for capacitive reactance between the wireless charging transmitting apparatus and the wireless charging receiving apparatus. In this embodiment of this application, energy transmission efficiency in the wireless charging system can be improved.

According to a second aspect, an embodiment of this application provides a wireless charging receiving apparatus. The wireless charging receiving apparatus includes a first receiving plate, a second receiving plate, and a rectifier circuit; the first receiving plate is connected to a first input end of the rectifier circuit, the second receiving plate is connected to a second input end of the rectifier circuit, and an output end of the rectifier circuit is connected to a load; a second contact is disposed on the first receiving plate, and when the second contact is in contact with a first contact on a first transmitting plate in a wireless charging transmitting apparatus, the first receiving plate establishes an electrical connection to the first transmitting plate; and the first receiving plate and the second receiving plate are not in contact with each other, and the second receiving plate is configured to perform electric field coupling with a second transmitting plate in the wireless charging transmitting apparatus through air.

With reference to the second aspect, in a first possible implementation, when the second contact is not in contact with the first contact on the first transmitting plate, the first receiving plate performs electric field coupling with the first transmitting plate through air.

With reference to the second aspect or with reference to the first possible implementation of the second aspect, in a second possible implementation, the wireless charging receiving apparatus is disposed on glasses, the first receiving plate is disposed on a surface of the glasses, and the second receiving plate is disposed inside a housing of a glasses arm of the glasses.

With reference to the second aspect or with reference to the first possible implementation of the second aspect, in a third possible implementation, the wireless charging receiving apparatus is disposed on a headset, the first receiving plate is disposed outside a housing of the headset, and the second receiving plate is disposed inside the housing of the headset.

With reference to the second aspect or with reference to the first possible implementation of the second aspect, in a fourth possible implementation, the wireless charging receiving apparatus is disposed on a watch, the first receiving plate is an exposed outer side of metal of a bottom cover of the watch, and the second receiving plate is disposed between an inner side of the bottom cover of the watch and a watch face.

With reference to the second aspect or any one of the foregoing possible implementations of the second aspect, in a fifth possible implementation, the wireless receiving apparatus includes a receiving coil, and the receiving coil and the second receiving plate are located on a same side of the first receiving plate; and the receiving coil is configured to generate electric energy in a high-frequency magnetic field generated by a transmitting coil in the wireless charging transmitting apparatus.

With reference to the fifth possible implementation of the second aspect, in a sixth possible implementation, two ends of the receiving coil are connected between the first input end of the rectifier circuit and the second input end of the rectifier circuit, and the electric energy of the receiving coil is transmitted to the load by using the rectifier circuit; or the wireless charging receiving apparatus further includes a magnetic field receiving circuit, two ends of the magnetic field receiving circuit are connected to two ends of the receiving coil, and the electric energy of the receiving coil is transmitted to the load through the magnetic field receiving circuit. In other words, the receiving coil may share the rectifier circuit with the two receiving plates to transmit the electric energy to the load, or another magnetic field receiving circuit may transmit the electric energy to the load.

With reference to the second aspect or with reference to any one of the foregoing possible implementations of the second aspect, in a fifth possible implementation, the wireless charging receiving apparatus further includes a second compensation circuit, the second compensation circuit is connected between the rectifier circuit, and the first receiving plate and the second receiving plate, and the second compensation circuit is configured to compensate for capacitive reactance between the wireless charging receiving apparatus and the wireless charging transmitting apparatus.

According to a third aspect, an embodiment of this application provides a wireless charging system. The wireless charging system includes the wireless charging transmitting apparatus in the first aspect or any one of the possible implementations of the first aspect, and the wireless charging receiving apparatus in the second aspect or any one of the possible implementations of the second aspect.

It should be understood that implementation and beneficial effects of the foregoing aspects of this application may be referred to each other.

DESCRIPTION OF EMBODIMENTS

Figure 1:
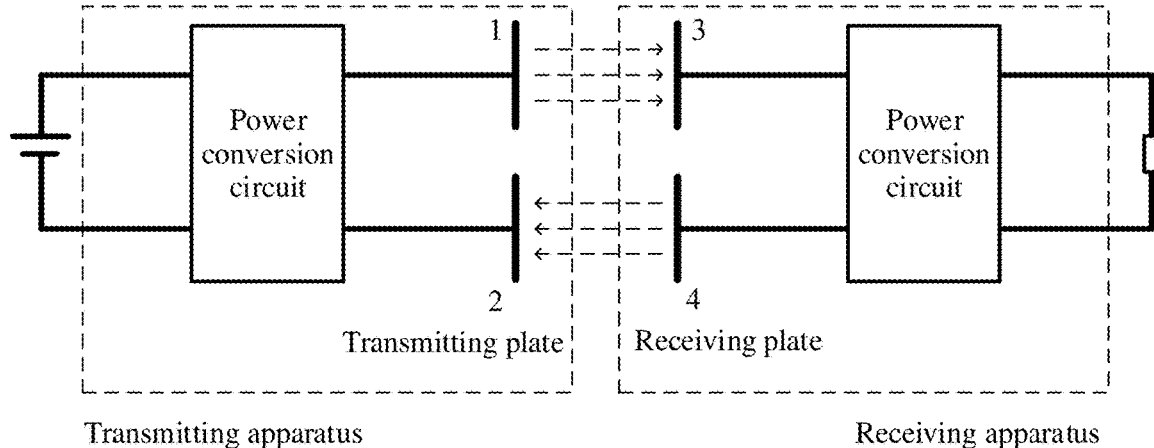
FIG. 1 is a system block diagram of a wireless charging system in the conventional technology.

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

Embodiments of this application may be applied to a wireless charging scenario. For example, a wireless charging transmitting apparatus provided in embodiments of this application may be specifically implemented as a wireless charging pad, a wireless charging disk, a wireless charging case, a wireless charging support, or the like. A wireless charging receiving apparatus provided in embodiments of this application may be disposed, for example, in at least one or more of a mobile phone terminal, a smartwatch, smart glasses, a Bluetooth headset, and a smart stylus.

During specific implementation, in embodiments of this application, structures of the wireless charging transmitting apparatus and the wireless charging receiving apparatus are changed, so that two transmitting plates in the wireless charging transmitting apparatus do not need to exactly face two receiving plates in the wireless charging receiving apparatus. One transmitting plate may establish an electrical connection to one receiving plate through a contact, to form a first alternating current power path, and the other transmitting plate and the other receiving plate establish electric field coupling through air to form a second alternating current power path. The first alternating current power path and the second alternating current power path implement a closed alternating current power loop.

Optionally, one transmitting plate and one receiving plate may not establish an electrical connection through a contact, but instead establish electric field coupling through air to form a first alternating current power path. The other transmitting plate and the other receiving plate still establish electric field coupling through air to form a second alternating current power path. The first alternating current power path and the second alternating current power path implement a closed alternating current power loop. In embodiments of this application, non-contact wireless charging is compatible, that is, whether the contact on the transmitting plate is in contact with the contact on the receiving plate is not limited in embodiments of this application.

In addition, currently, terminal devices of various categories need to be separately equipped with dedicated wireless chargers, that is, different terminal devices need different wireless chargers, and wireless charger normalization cannot be implemented. However, in embodiments of this application, the wireless charging transmitting apparatus may charge a plurality of wireless charging receiving apparatuses at the same time, that is, perform one-to-many charging, thereby implementing wireless charger normalization, and making wireless charging more convenient.

Technical solutions of this application are further described below in detail with reference to the accompanying drawings.

Figure 2:
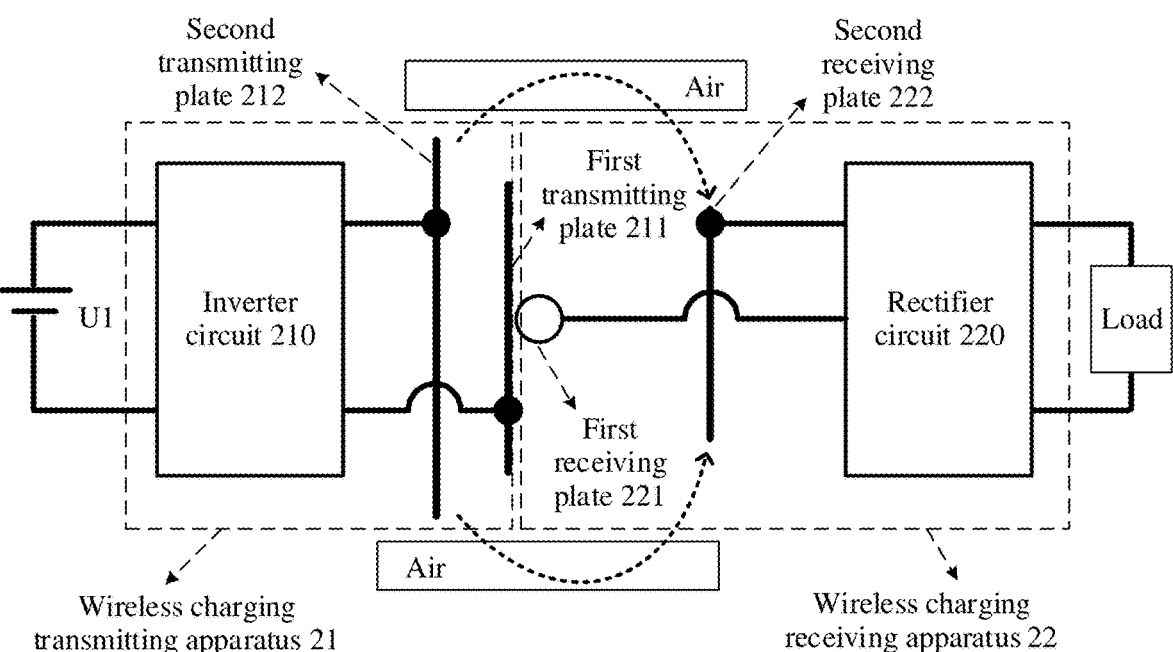
FIG. 2 is a system block diagram of a wireless charging system according to an embodiment of this application.

FIG. 2 is a system block diagram of a wireless charging system according to an embodiment of this application. As shown in FIG. 2, the wireless charging system provided in this embodiment of this application includes a wireless charging transmitting apparatus 21 and a wireless charging receiving apparatus 22.

The wireless charging transmitting apparatus 21 includes an inverter circuit 210, a first transmitting plate 211, and a second transmitting plate 212. An input end of the inverter circuit 210 is connected to a direct current power supply U1, a first output end of the inverter circuit 210 is connected to the first transmitting plate 211, and a second output end of the inverter circuit 210 is connected to the second transmitting plate 212. In addition, the first transmitting plate 211 and the second transmitting plate 212 are not in contact with each other. For example, to avoid contact between the first transmitting plate 211 and the second transmitting plate 212, insulation processing may be performed on the second transmitting plate 212, or the first transmitting plate 211 and the second transmitting plate 212 may be separated by using an insulator.

The wireless charging receiving apparatus 22 includes a first receiving plate 221, a second receiving plate 222, and a rectifier circuit 220. The first receiving plate 221 is connected to a first input end of the rectifier circuit 220, the second receiving plate 222 is connected to a second input end of the rectifier circuit 220, and an output end of the rectifier circuit 220 is connected to a load. In addition, the first receiving plate 221 and the second receiving plate 222 are not in contact with each other. Similarly, to avoid contact between the first receiving plate 221 and the second receiving plate 222, insulation processing may be performed on the second receiving plate 222, or the first receiving plate 221 and the second receiving plate 222 may be separated by using an insulator.

It should be noted that whether the second transmitting plate 212 and the second receiving plate 222 are exposed or insulated is not limited in this embodiment of this application.

The direct current power supply U1 may be, for example, a battery (like a nickel-cadmium battery, a nickel-hydrogen battery, a lithium-ion battery, or a lithium polymer battery) or a storage battery. The direct current power supply U1 may be configured to couple an upper-level circuit, for example, an Alternating Current/Direct Current (AC/DC) converter or another DC/DC converter (like a buck converter, a boost converter, or a buck-boost converter). In other words, the direct current power supply U1 may be a direct power supply, or may be an indirect power supply that performs transmission through a circuit. For example, the direct current power supply U1 may be specifically implemented as a power adapter (for example, a mobile phone adapter or a computer adapter).

The inverter circuit 210 converts a direct current output by the direct current power supply U1 into an alternating current, and transmits the alternating current to the first transmitting plate 211 and the second transmitting plate 212. For example, the inverter circuit 210 may be a full-bridge inverter circuit, a half-bridge inverter circuit, or a Class E inverter circuit. For implementation of a specific structure of the circuit, refer to the conventional technology. Details are not described herein. A specific structure of the inverter circuit 210 is not limited in this embodiment of this application.

The first transmitting plate 211 may be made of a conductive material, for example, copper foil, aluminum foil, an iron sheet, or conductive ceramic. A first contact is disposed on the first transmitting plate 211. For example, insulation processing may not be performed on the first transmitting plate 211, and a surface of the first transmitting plate 211 is the first contact. Optionally, insulation processing may be partially performed on the first transmitting plate 211, and an exposed metal part of the first transmitting plate 211 is the first contact. Alternatively, the first contact may be a metal sheet like copper foil, aluminum foil, or iron pasted on a surface of the first transmitting plate 211. In general, the first contact is a conductive part in the first transmitting plate 211.

The first receiving plate 221 may be disposed in a to-be-charged terminal device. The first receiving plate 221 may be made of a conductive material like copper foil, aluminum foil, an iron sheet, or conductive ceramic, or may be specifically implemented as a metal housing of the terminal device, for example, a metal housing of a mobile phone, a metal bottom cover of a watch, or a metal glasses frame of glasses. Therefore, a shape of the first receiving plate 221 may be a circle shown in FIG. 2, or may be a diamond shape, a rectangle shape, or the like. It should be understood that FIG. 2 shows an example of the shape of the first receiving plate 221, and should not be construed as a limitation. The shape of the first receiving plate 221 may change with a shape of the terminal device.

A second contact is disposed on the first receiving plate 221. For example, insulation processing may not be performed on the first receiving plate 221, and a surface of the first receiving plate 221 is the second contact. Similarly, insulation processing may be partially performed on the first receiving plate 221, and an exposed metal part of the first receiving plate 221 is the second contact. Alternatively, the second contact may be a metal sheet like copper foil, aluminum foil, or iron pasted on a surface of the first receiving plate 221. In general, the second contact is a conductive part in the first receiving plate 221.

During specific implementation, when the first contact on the first transmitting plate 211 is in contact with the second contact on the first receiving plate 221, an electrical connection is established between the first transmitting plate 211 and the first receiving plate 221. However, the second transmitting plate 212 and the second receiving plate 222 form an energy loop by performing electric field coupling through air, that is, the second transmitting plate 212 and the second receiving plate 222 are not in contact with each other. Under effect of an electric field generated by the second transmitting plate 212, the second receiving plate 222 generates an alternating current, and transmits the alternating current to the rectifier circuit 220. For example, the second transmitting plate 212 is connected to a high potential output by the inverter circuit 210. In this case, a closed energy transmission path in the wireless charging system is from a positive electrode of the direct current power supply U1, the second output end (high potential) of the inverter circuit 210, the second transmitting plate 212, the second receiving plate 222, the second input end of the rectifier circuit 220, the load, the first input end of the rectifier circuit 220, the first receiving plate 221, the first transmitting plate 211, and the first output end of the inverter circuit 210 to a negative electrode of the direct current power supply U1.

The rectifier circuit 220 converts an alternating current between the first receiving plate 221 and the second receiving plate 222 into a direct current, and transmits the direct current to the load, to provide the direct current to the load, so that the wireless charging transmitting apparatus 21 charges the wireless charging receiving apparatus 22. The load may be, for example, a capacitor, a resistor, a lithium battery, or a chip.

For example, the rectifier circuit 220 may be a full-bridge rectifier circuit, a half-bridge rectifier circuit, or a Class E rectifier circuit. For a specific structure of the circuit, refer to the conventional technology. Details are not described herein. A specific structure of the rectifier circuit 220 is not limited in this embodiment of this application.

In this embodiment of this application, first, wireless charging is performed by using an electric field coupling principle so that a wireless charging system is light and has low costs. In addition, the first contact is added to the first transmitting plate of the wireless charging transmitting apparatus, and the second contact is added to the first receiving plate of the wireless charging receiving apparatus. Different from the conventional technology in which electric field coupling is implemented by disposing two transmitting plates that exactly face two receiving plates, in this embodiment of this application, an electrical connection between the first transmitting plate and the first receiving plate may be established through contact between the first contact and the second contact, and electric field coupling is performed between the second transmitting plate and the second receiving plate, to implement a closed electric energy transmission path. It may be understood that, in this embodiment of this application, no extra material needs to be added to establish the electrical connection by using the contacts. In a wireless charging scenario, only the first contact in the wireless charging transmitting apparatus needs to be in contact with the second contact in the wireless charging receiving apparatus. The wireless charging transmitting apparatus has high tolerance for the shape of the receiving plate, and can be compatible with receiving plates of different forms. In addition, a contact area between the first contact and the second contact is not limited. Therefore, in this embodiment of this application, energy transmission can be implemented in a large range, thereby improving a deviation capability of wireless charging.

In addition, the wireless charging transmitting apparatus provided in this embodiment of this application may charge a plurality of wireless charging receiving apparatuses, that is, implement one-to-many charging, thereby implementing wireless charger normalization, and making wireless charging more convenient.

It should be noted that when the first contact is not in contact with the second contact, for example, when the wireless charging receiving apparatus is in a process of approaching or being away from the wireless charging transmitting apparatus, the first transmitting plate and the first receiving plate may still perform electric field coupling through air. In this case, an energy loop may still be formed. In other words, it may be understood that the wireless charging system provided in this embodiment of this application may be compatible with a form of forming an energy loop by establishing an electrical connection between two contacts, and may further be compatible with a form in which the first contact on the first transmitting plate is not in contact with the second contact on the first receiving plate, and an energy loop is formed through electric field coupling between the first contact on the first transmitting plate and the second contact on the first receiving plate.

Figure 3:
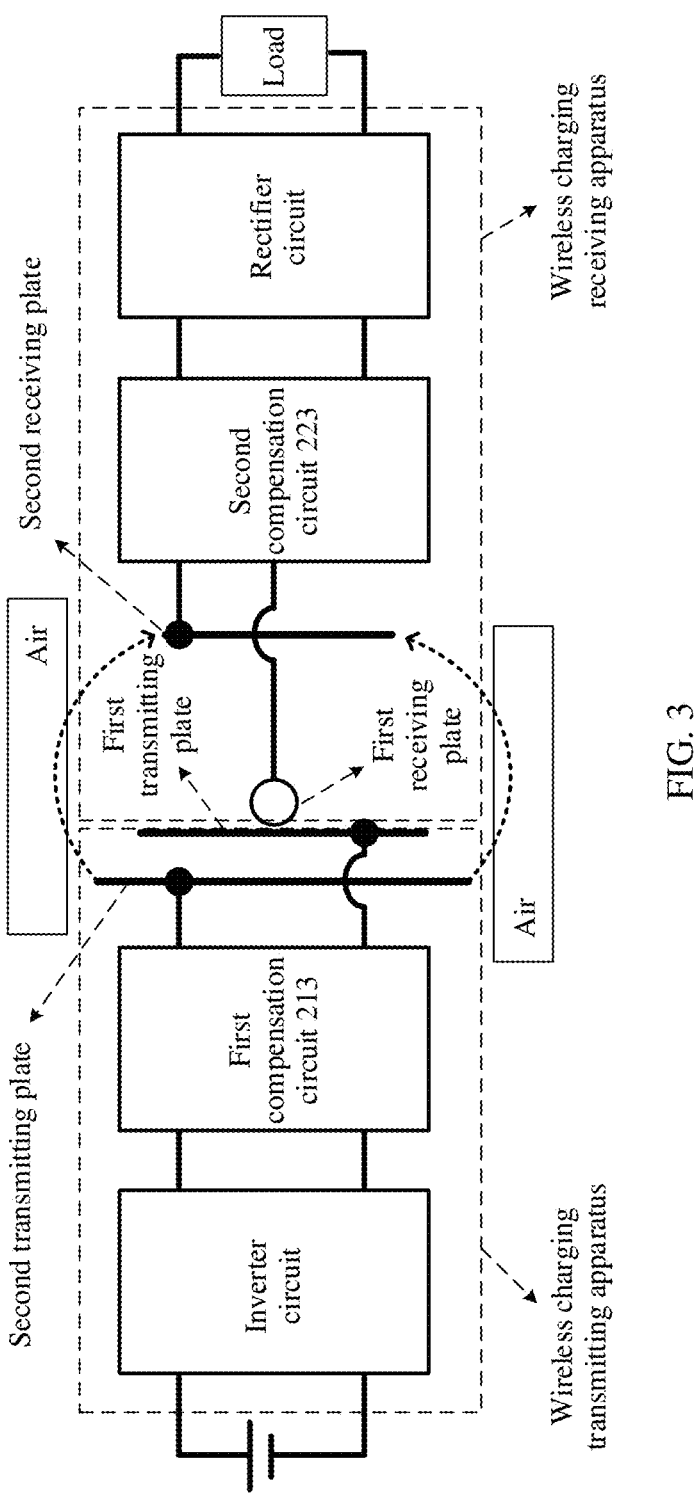
FIG. 3 is another system block diagram of a wireless charging system according to an embodiment of this application.

In some feasible implementations, FIG. 3 is another system block diagram of a wireless charging system according to an embodiment of this application. As shown in FIG. 3, the wireless charging transmitting apparatus provided in this embodiment of this application further includes a first compensation circuit 213. The first compensation circuit is connected between the inverter circuit, and the first transmitting plate and the second transmitting plate. The first compensation circuit 213 may compensate for capacitive reactance between the wireless charging transmitting apparatus and the wireless charging receiving apparatus, that is, compensate for reactive power in the wireless charging system, so that energy transmission efficiency in the wireless charging system can be improved. For example, the first compensation circuit 213 may include at least one of a capacitor and an inductor.

Optionally, the wireless charging receiving apparatus provided in this embodiment of this application further includes a second compensation circuit 223. The second compensation circuit 223 is connected between the rectifier circuit, and the first receiving plate and the second receiving plate. The second compensation circuit 223 may compensate for capacitive reactance between the wireless charging receiving apparatus and the wireless charging transmitting apparatus, that is, compensate for reactive power in the wireless charging system, so that energy transmission efficiency in the wireless charging system can be further improved. For example, the second compensation circuit 223 also includes at least one of an inductor or a capacitor.

It should be noted that the wireless charging system may include at least one of the first compensation circuit 213 and the second compensation circuit 223. In other words, the first compensation circuit 213 and the second compensation circuit 223 may both exist, or may exist independently. In addition, even if the first compensation circuit 213 and the second compensation circuit 223 both exist, circuit structures of the first compensation circuit 213 and the second compensation circuit 223 may be different, provided that the capacitive reactance between the wireless charging receiving apparatus and the wireless charging transmitting apparatus can be compensated for. A specific circuit structure of the compensation circuit is not limited.

The following describes specific structures of the first transmitting plate and the second transmitting plate in the wireless charging transmitting apparatus in embodiments of this application with reference to FIG. 4 to FIG. 10.

Figure 4:
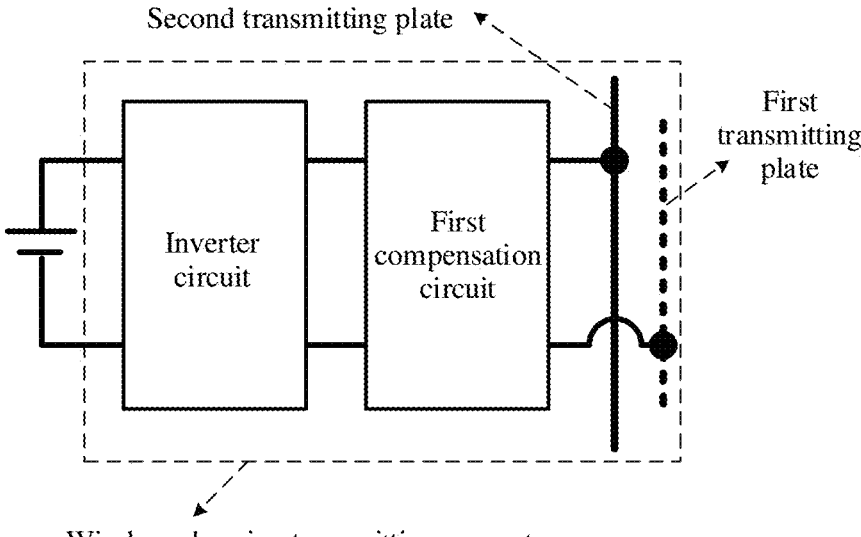
FIG. 4 is a block diagram of a structure of a wireless charging transmitting apparatus according to an embodiment of this application.

First, refer to FIG. 4. FIG. 4 is a block diagram of a structure of a wireless charging transmitting apparatus according to an embodiment of this application. As shown in FIG. 4, a projection of the first transmitting plate in the wireless charging transmitting apparatus in a first direction partially overlaps a projection of the second transmitting plate in the first direction, and the first direction is perpendicular to a plane on which the first transmitting plate is located or is perpendicular to a plane on which the second transmitting plate is located. In this case, a stacking structure is formed between the first transmitting plate and the second transmitting plate. Different from a structure in which transmitting plates are disposed in parallel in the conventional technology, in this embodiment of this application, a transmitting plate stacking manner is used, so that a surface area of the wireless charging transmitting apparatus is small.

Figure 5A:
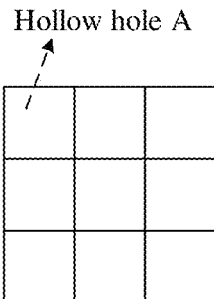
FIG. 5A and FIG. 5B are a diagram of a structure of a first transmitting plate according to an embodiment of this application.

In some feasible implementations, the first transmitting plate is of a mesh structure. For example, refer to FIG. 5A. FIG. 5A is a diagram of a structure of a first transmitting plate according to an embodiment of this application. As shown in FIG. 5A, the mesh structure of the first transmitting plate includes a plurality of hollow holes A and a plurality of conducting wires between the plurality of hollow holes.

It should be noted that the plurality of conducting wires may enclose hollow holes of different shapes, for example, triangles or pentagons. In FIG. 5A, a case in which the mesh structure is specifically presented as a quadrilateral is merely used as an example, and should not be understood as a limitation on the mesh structure. It should be understood that a shape of a hollow part in the mesh structure is not limited in this embodiment of this application.

In this embodiment of this application, the first transmitting plate is set as the mesh structure, so that blocking of the second transmitting plate by the first transmitting plate can be reduced, and an overlapping area between the second transmitting plate and the second receiving plate is increased. Mutual coupling strength between the second transmitting plate and the second receiving plate is positively correlated with the overlapping area between the two plates, and the mutual coupling strength between the second transmitting plate and the second receiving plate is positively correlated with transmission efficiency of the wireless charging system. Therefore, in this embodiment of this application, the mutual coupling strength between the second transmitting plate and the second receiving plate can be improved, that is, transmission efficiency of the wireless charging system can be improved.

Figure 5B:
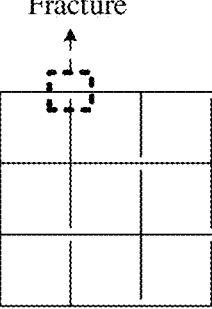

Further, in some feasible implementations, refer to FIG. 5B. FIG. 5B is a diagram of a structure of a first transmitting plate according to an embodiment of this application. As shown in FIG. 5B, no closed loop is formed between the plurality of conducting wires included in the mesh structure. For example, in FIG. 5B, the hollow hole is a quadrilateral, and ends of four sides of the quadrilateral are not sequentially connected to form a closed quadrilateral. For example, a first wire is connected to a second wire, the second wire is connected to a third wire, the third wire is connected to a fourth wire, and the fourth wire is not connected to the first wire (that is, there is a fracture between the fourth wire and the first wire). It may be understood that, although the four sides of each hollow hole shown in FIG. 5B do not form a closed loop, the sides of each hollow hole are connected to a same wire (for example, a leftmost vertical wire). In other words, the plurality of conducting wires between the plurality of hollow holes included in the first transmitting plate are all connected to a same potential point (that is, the plurality of conducting wires are all connected to the first output end of the inverter circuit).

In this embodiment of this application, an eddy current loop on the first transmitting plate can be reduced, so that no eddy current temperature rise occurs on the first transmitting plate, thereby reducing an eddy current loss on the first transmitting plate, and further improving transmission efficiency of wireless charging.

Figure 6:
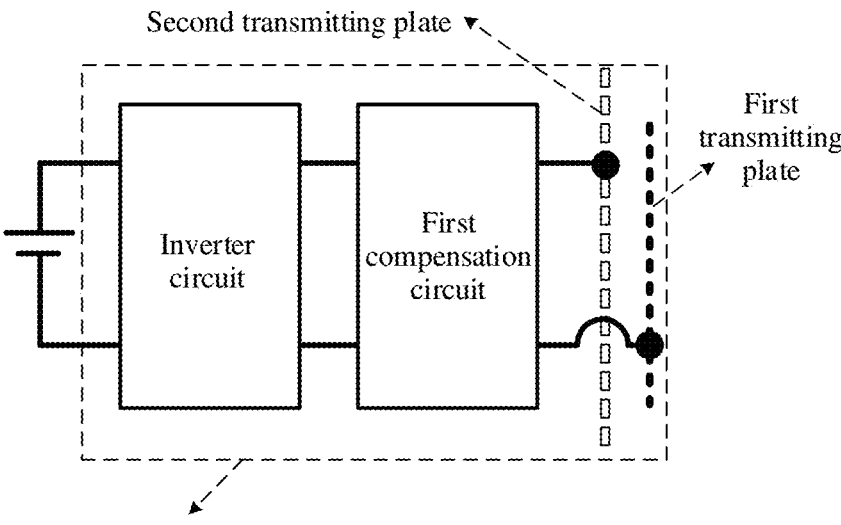
FIG. 6 is another block diagram of a structure of a wireless charging transmitting apparatus according to an embodiment of this application.

Optionally, in some feasible implementations, refer to FIG. 6. FIG. 6 is another block diagram of a structure of a wireless charging transmitting apparatus according to an embodiment of this application. A difference between the wireless charging transmitting apparatus shown in FIG. 6 and the wireless charging transmitting apparatus shown in FIG. 4 lies in that a structure of the second transmitting plate is different.

Figure 7A:
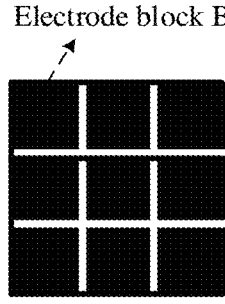
FIG. 7A and FIG. 7B are a diagram of a structure of a second transmitting plate according to an embodiment of this application.

In some feasible implementations, refer to FIG. 7A. FIG. 7A is a diagram of a structure of a second transmitting plate according to an embodiment of this application. As shown in FIG. 7A, the second transmitting plate includes a plurality of electrode blocks that communicate with each other B (black parts), and electric field coupling is performed between each electrode block B and the second receiving plate in the wireless charging receiving apparatus through air. On the second transmitting plate shown in FIG. 7A, a white part is not conducted, and a black part is conducted. The second transmitting plate is cut into a plurality of single electrode blocks. Although all the electrode blocks are still connected to a same potential point (namely, the second output end of the inverter circuit), the overlapping area between the first transmitting plate and the second transmitting plate can still be reduced. Because the first transmitting plate and the second transmitting plate are self-coupled, a size of self-coupling between the first transmitting plate and the second transmitting plate is positively correlated with the overlapping area between the two transmitting plates, and is negatively correlated with transmission efficiency of the wireless charging system. Therefore, self-coupling between the first transmitting plate and the second transmitting plate can be reduced, and transmission efficiency of the wireless charging system can be improved.

Further, each electrode block B may correspond to a hollow hole on the first transmitting plate, and each electrode block may be accommodated in a projection that is of a hollow hole corresponding to the electrode block and that is on the second transmitting plate. In other words, the electrode block on the second transmitting plate does not exactly face the conducting wire that is on the first transmitting plate and that encloses the hollow hole.

It may be understood that a shape of the electrode block B on the second transmitting plate changes with a shape of the hollow hole on the first transmitting plate.

In this embodiment of this application, the second transmitting plate is set as the plurality of electrode blocks B, and each electrode block B may be accommodated in a projection that is of a hollow hole corresponding to the electrode block and that is on the second transmitting plate, so that the overlapping area between the first transmitting plate and the second transmitting plate can be further reduced. Therefore, in this embodiment of this application, self-coupling between the first transmitting plate and the second transmitting plate can be further reduced, and transmission efficiency of the wireless charging system can be improved.

Figure 7B:
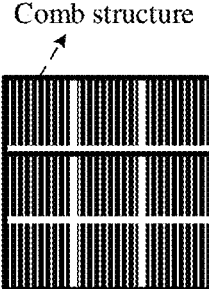

Further, in some feasible implementations, refer to FIG. 7B. FIG. 7B is a diagram of a structure of a second transmitting plate according to an embodiment of this application. As shown in FIG. 7B, each electrode block is of a comb structure. It may be understood that the comb structure includes a plurality of gate strips, and each gate strip cuts each electrode block into a sub-electrode block, so that a quantity of eddy current loops formed in each electrode block can be reduced.

In this embodiment of this application, the second transmitting plate is set as the comb structure, so that an eddy current loop on the second transmitting plate can be reduced, and no eddy current temperature rise occurs on the second transmitting plate, thereby reducing an eddy current loss on the second transmitting plate, and further improving transmission efficiency of wireless charging.

Figure 8:
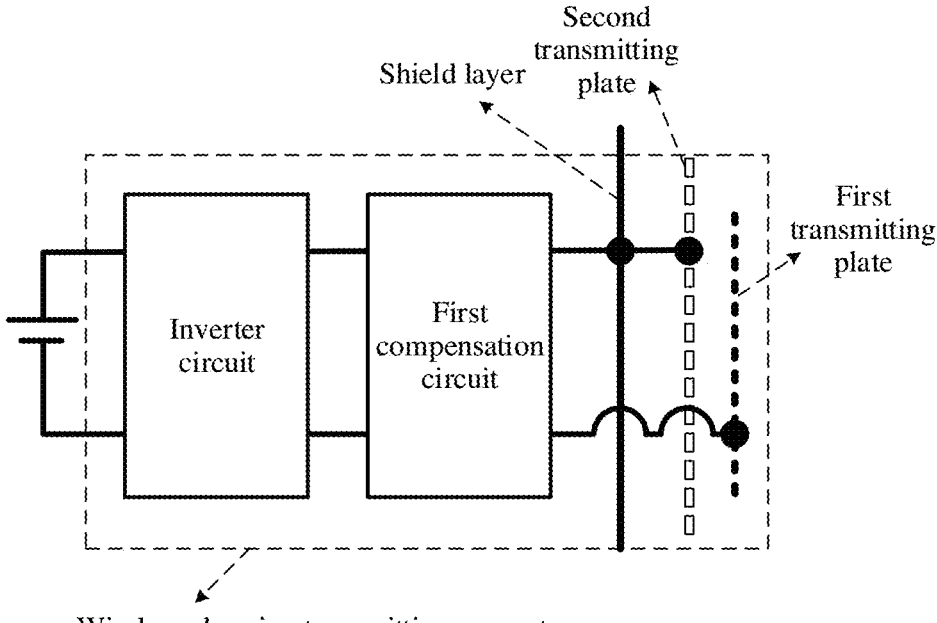
FIG. 8 is another block diagram of a structure of a wireless charging transmitting apparatus according to an embodiment of this application.

Optionally, in some feasible implementations, refer to FIG. 8. FIG. 8 is another block diagram of a structure of a wireless charging transmitting apparatus according to an embodiment of this application. As shown in FIG. 8, the wireless charging transmitting apparatus further includes a shield layer. The shield layer is disposed in a projection region of the second transmitting plate in a second direction, where the second direction is opposite to a third direction, and the third direction is a direction in which the second transmitting plate is projected to the second receiving plate. In other words, the shield layer is disposed on a side that is of the second transmitting plate and that does not need to perform electric field coupling with the second receiving plate.

For example, the shield layer may be made of metal such as copper foil, aluminum foil, or an iron sheet.

In this embodiment of this application, the shield layer is added to the wireless charging transmitting apparatus.

Because an electric field exists in all directions, the shield layer is disposed on the side that is of the second transmitting plate and that does not need to perform electric coupling with the second receiving plate, so that electric field leakage of the wireless charging transmitting apparatus can be reduced, and wireless charging security and reliability can be improved.

Figure 9:
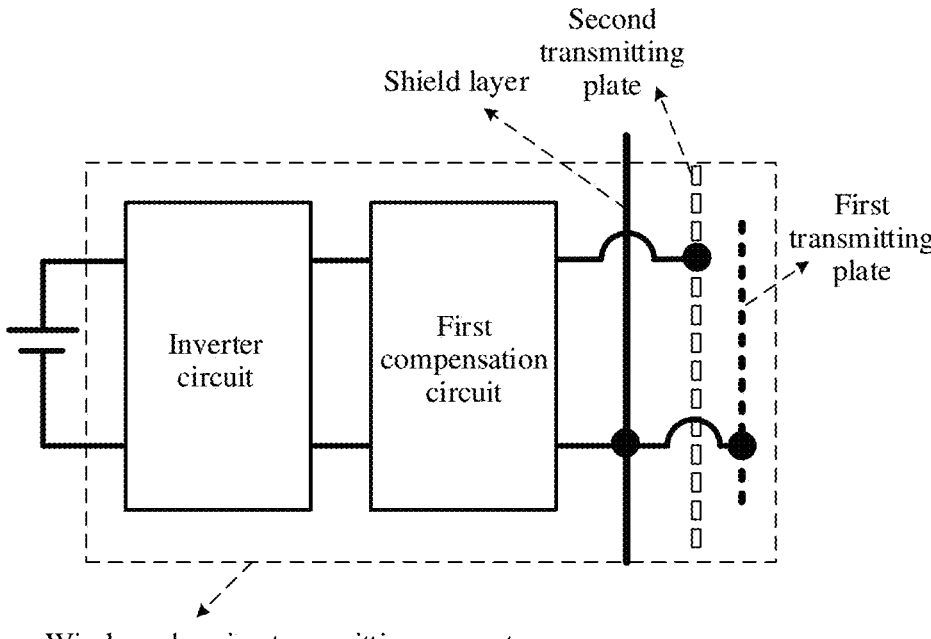
FIG. 9 is another block diagram of a structure of a wireless charging transmitting apparatus according to an embodiment of this application.

Further, refer to FIG. 9. FIG. 9 is another block diagram of a structure of a wireless charging transmitting apparatus according to an embodiment of this application. A difference between the wireless charging transmitting apparatus shown in FIG. 9 and the wireless charging transmitting apparatus shown in FIG. 8 lies in a connection relationship of the shield layer. As shown in FIG. 9, the shield layer and the first transmitting plate may be jointly connected to the first output end of the inverter circuit. Alternatively, the shield layer and the second transmitting plate may be jointly connected to the second output end of the inverter circuit.

For example, if the first output end of the inverter circuit is a high potential, and the second output end of the inverter circuit is a low potential (for example, GND), the wireless charging transmitting apparatus may have a plurality of connection manners. For example, the first transmitting plate and the shield layer are connected to GND, and the second transmitting plate is connected to the high potential; or the first transmitting plate is connected to GND, and the shield layer and the second transmitting plate are connected to the high potential; or the first transmitting plate is connected to the high potential, and the shield layer and the second transmitting plate are connected to GND; or the first transmitting plate and the shield layer are connected to the high potential, and the second transmitting plate is connected to GND.

However, regardless of which transmitting plate the shield plate is connected to, self-coupling between the first transmitting plate and the second transmitting plate is increased. Therefore, to reduce self-coupling between the first transmitting plate and the second transmitting plate, the shield layer may comprise a mesh structure (for example, refer to the diagram of the structure shown in FIG. 5A).

Figure 10:
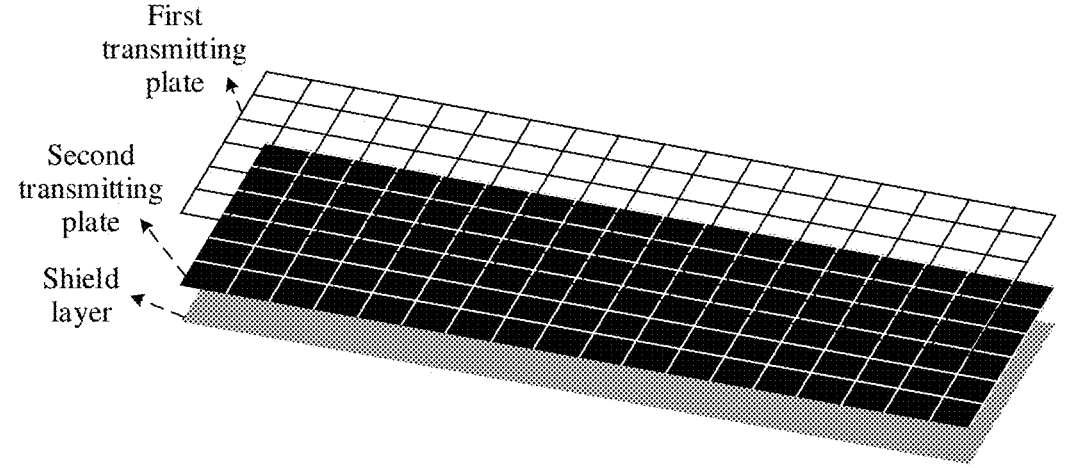
FIG. 10 is a diagram of a partial structure of a wireless charging transmitting apparatus according to an embodiment of this application.

With reference to the embodiments described in FIG. 4 to FIG. 9, for a structure between the first transmitting plate, the second transmitting plate, and the shield layer in the wireless charging transmitting apparatus provided in this embodiment of this application, refer to a diagram of a partial structure shown in FIG. 10. It may be understood that FIG. 10 merely describes an example of the structure between the first transmitting plate, the second transmitting plate, and the shield layer, and does not constitute a limitation thereto. For example, the first transmitting plate may be provided with a fracture as shown in FIG. 5B, the second transmitting plate may include the plurality of electrode blocks of the comb structure as shown in FIG. 7B, and the shield layer may comprise the mesh structure.

Figure 11:
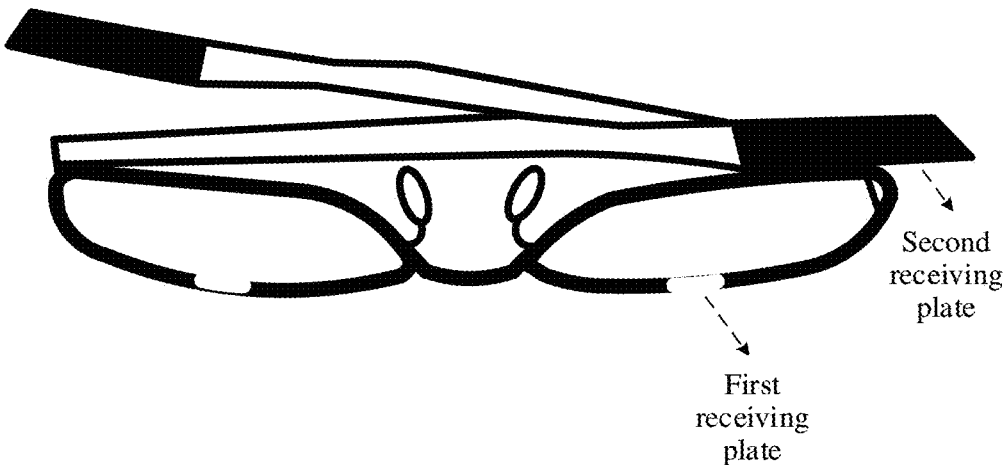
FIG. 11 is a diagram in which a wireless charging receiving apparatus is glasses according to an embodiment of this application.
Figure 12:
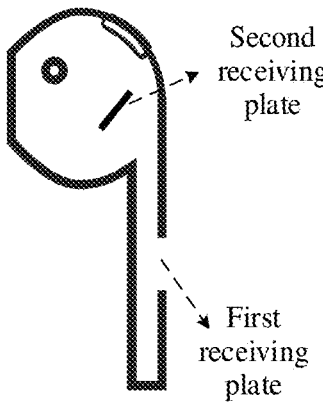
FIG. 12 is a diagram in which a wireless charging receiving apparatus is a headset according to an embodiment of this application.
Figure 13:
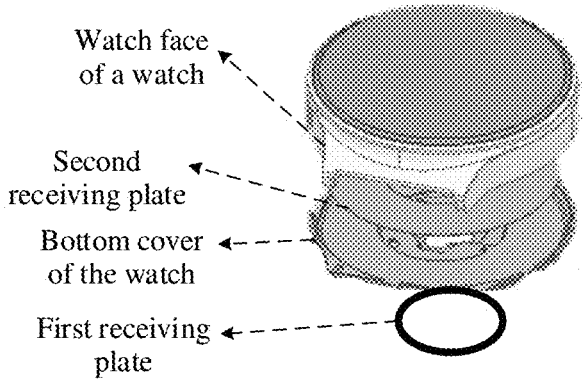
FIG. 13 is a diagram in which a wireless charging receiving apparatus is a watch according to an embodiment of this application.

The following describes an example of an application scenario of a wireless charging receiving apparatus in an embodiment of this application with reference to FIG. 11 to FIG. 13.

In some feasible implementations, refer to FIG. 11. FIG. 11 is a diagram in which a wireless charging receiving apparatus is glasses according to an embodiment of this application. As shown in FIG. 11, the wireless charging receiving apparatus is disposed on the glasses. The first receiving plate is disposed on a surface of the glasses, for example, an exposed part of a metal glasses frame, and a part that is on an outer side of a glasses arm and on which a metal sheet is pasted. The second receiving plate is disposed in a housing of the glasses arm of the glasses. The rectifier circuit included in the wireless charging receiving apparatus may also be disposed in the housing (not shown in the figure) of the glasses arm. The rectifier circuit and the second receiving plate may directly establish a connection relationship by using a copper foil trace on a printed circuit board PCB, and a connection relationship between the rectifier circuit and the first receiving plate may be established by using a wire (not shown in the figure).

For example, a shape of the second receiving plate may follow a shape of the glasses arm of the glasses. The shape of the second receiving plate is not limited in this application.

It should be noted that the glasses have a left glasses arm and a right glasses arm. The left glasses arm and a left surface part of the metal glasses frame may be considered as a wireless charging receiving apparatus, and the right glasses arm and a right surface part of the metal glasses frame may be considered as another wireless charging receiving apparatus. Therefore, there is no charging conflict between the left glasses arm and the right glasses arm of the glasses, and wireless charging may be separately performed on the two wireless charging receiving apparatuses corresponding to the glasses.

Optionally, in some feasible implementations, refer to FIG. 12. FIG. 12 is a diagram in which a wireless charging receiving apparatus is a headset according to an embodiment of this application. As shown in FIG. 12, the wireless charging receiving apparatus is disposed on the headset, where the first receiving plate is disposed outside a housing of the headset, and the second receiving plate is disposed inside the housing of the headset. A shape of the second receiving plate may follow a shape of an earbud hole.

For example, on the first receiving plate, in a form of electroplating, metal such as copper foil, aluminum foil, or an iron sheet may be plated outside the housing of the headset. The housing of the headset may be a currently used plastic housing.

The rectifier circuit included in the wireless charging receiving apparatus may also be disposed in the housing (not shown in the figure) of the headset. The rectifier circuit and the second receiving plate may directly establish a connection relationship by using a copper foil trace on a printed circuit board PCB, and a connection relationship between the rectifier circuit and the first receiving plate may also be established by using a PCB, or may be established by using a wire in the housing (not shown in the figure) of the headset.

Optionally, in some feasible implementations, refer to FIG. 13. FIG. 13 is a diagram in which a wireless charging receiving apparatus is a watch according to an embodiment of this application. As shown in FIG. 13, the wireless charging receiving apparatus is disposed on a watch. The first receiving plate is an exposed outer side of metal of a bottom cover of the watch, and the second receiving plate is disposed between an inner side of the bottom cover of the watch and a watch face.

For example, the first receiving plate and the bottom cover of the watch may be the same object, that is, the bottom cover of the watch is made of metal. In this case, a metal part of the bottom cover of the watch that is exposed on the outer side is the first receiving plate. The second receiving plate is disposed between the inner side of the bottom cover of the watch and the watch face. The inner side of the bottom cover of the watch is insulated, and is used to isolate contact between the second receiving plate and the first receiving plate. Alternatively, the second receiving plate may be set as a watch bezel.

Optionally, the watch further includes a blood oxygen heart rate detection module PPG, and the first receiving plate may be disposed on an outer circle of a window of the PPG. Alternatively, the watch further includes an ECG detection module. In this case, the first receiving plate may reuse the ECG, is sheet-shaped, is not insulated, and is in contact with the first transmitting plate to establish an electrical connection.

The foregoing are examples of application of the wireless charging receiving apparatus in embodiments of this application, but are not exhaustive. It should be understood that the wireless charging receiving apparatus in this application may be applied to any wireless charging scenario, for example, wireless charging of an electric vehicle or wireless charging of a mobile robot.

Figure 14:
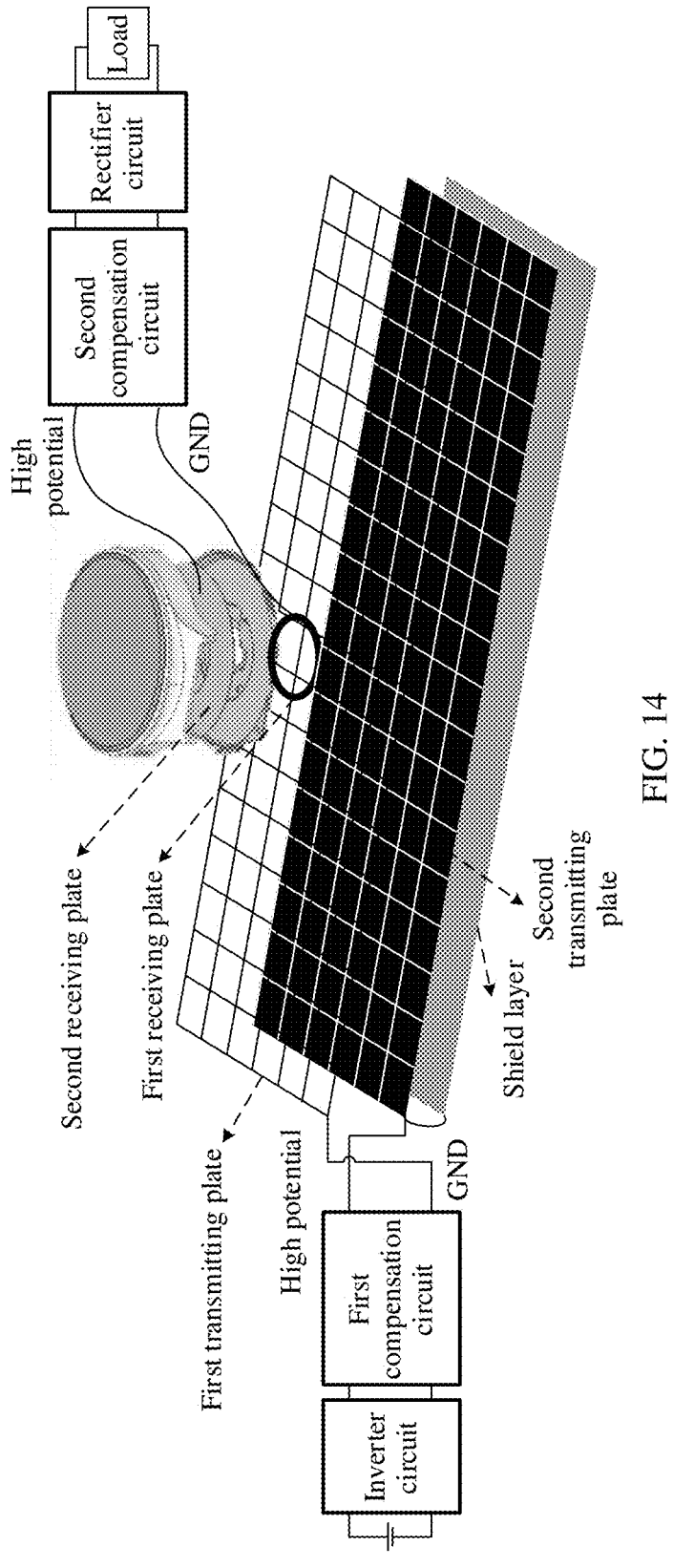
FIG. 14 is a system diagram of a wireless charging system according to an embodiment of this application.

For example, the wireless charging receiving apparatus is disposed on a watch. For a system diagram of the wireless charging system provided in this embodiment of this application, refer to FIG. 14. FIG. 14 is a system diagram of the wireless charging system according to an embodiment of this application. As shown in FIG. 14, the wireless charging system may implement any feasible implementation described in FIG. 2 to FIG. 13. Details are not repeated herein again.

Figure 15:
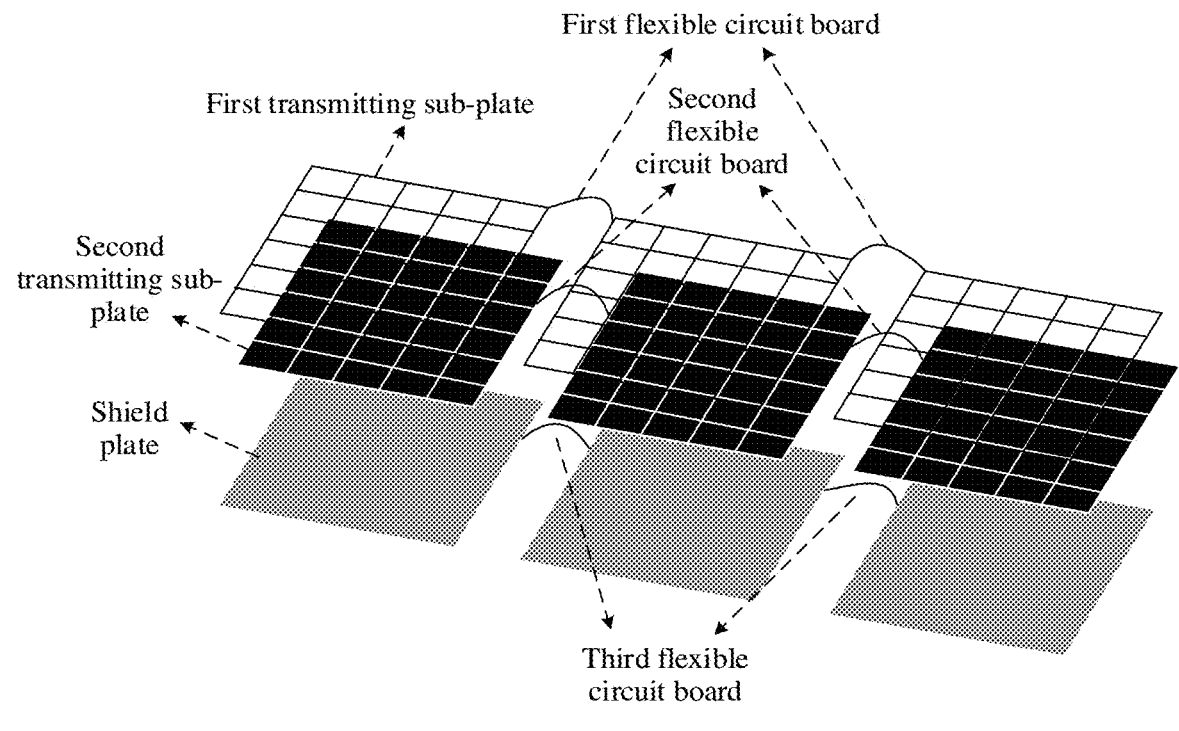
FIG. 15 is another diagram of a partial structure of a wireless charging transmitting apparatus according to an embodiment of this application.

In some feasible implementations, refer to FIG. 15. FIG. 15 is another diagram of a partial structure of a wireless charging transmitting apparatus according to an embodiment of this application. As shown in FIG. 15, the first transmitting plate includes n first transmitting sub-plates, where n is not less than 2. For example, in FIG. 15, n=3 is used as an example for description.

Any first transmitting sub-plate is connected to another adjacent first transmitting sub-plate through a first flexible circuit board.

The second transmitting plate includes second transmitting sub-plates corresponding to the first transmitting sub-plates, and any second transmitting sub-plate is connected to another adjacent second transmitting sub-plate through a second flexible circuit board. It may be understood that the first transmitting sub-plate and the corresponding second transmitting sub-plate may have a same size, or a surface area of the first transmitting sub-plate is greater than a surface area of the corresponding second transmitting sub-plate, or a surface area of the first transmitting sub-plate is less than a surface area of the corresponding second transmitting sub-plate. It may be understood that a relative size relationship between the first transmitting sub-plate and the corresponding second transmitting sub-plate is limited, provided that the first transmitting sub-plate and the corresponding second transmitting sub-plate can be folded.

Optionally, the wireless charging transmitting apparatus further includes a shield layer, the shield layer includes shield plates corresponding to the second transmitting sub-plates, and any shield plate is connected to another adjacent shield plate through a third flexible circuit.

One first transmitting sub-plate, one corresponding second transmitting sub-plate, and one shield plate may be one wireless charging transmitting end.

Figure 16:
FIG. 16 is a side view of a wireless charging pad that is unfolded according to an embodiment of this application.
Figure 17:
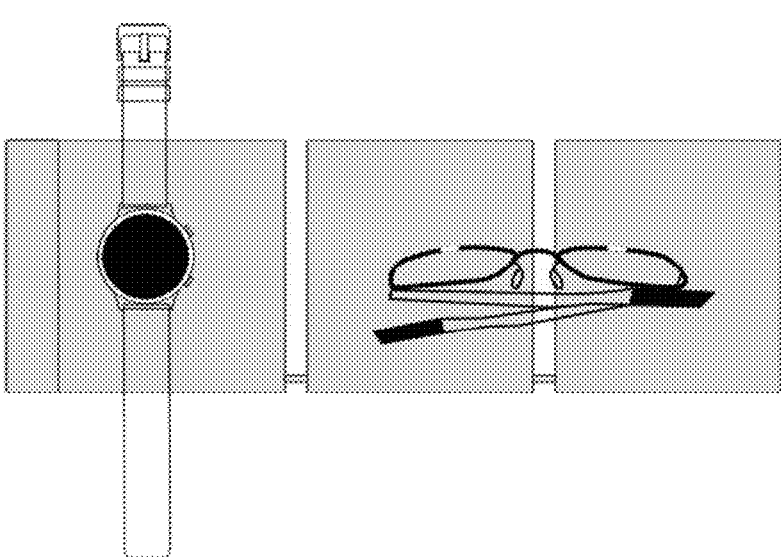
FIG. 17 is a top view of a wireless charging pad that is unfolded to supply power according to an embodiment of this application.

For example, the first transmitting plate, the second transmitting plate, and the shield layer shown in FIG. 15 may be specifically presented as a wireless charging pad. A side view of the wireless charging pad that is unfolded is shown in FIG. 16. The wireless charging pad may charge different terminal devices at the same time. For example, refer to FIG. 17. The wireless charging pad in FIG. 17 is unfolded. For example, the wireless charging pad has three wireless charging ends, and may simultaneously perform wireless charging on a watch, a left side of glasses, and a right side of the glasses.

Figure 18:
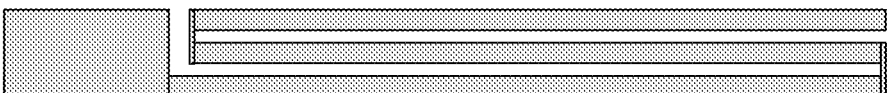
FIG. 18 is a side view of a wireless charging pad that is folded according to an embodiment of this application.
Figure 19:
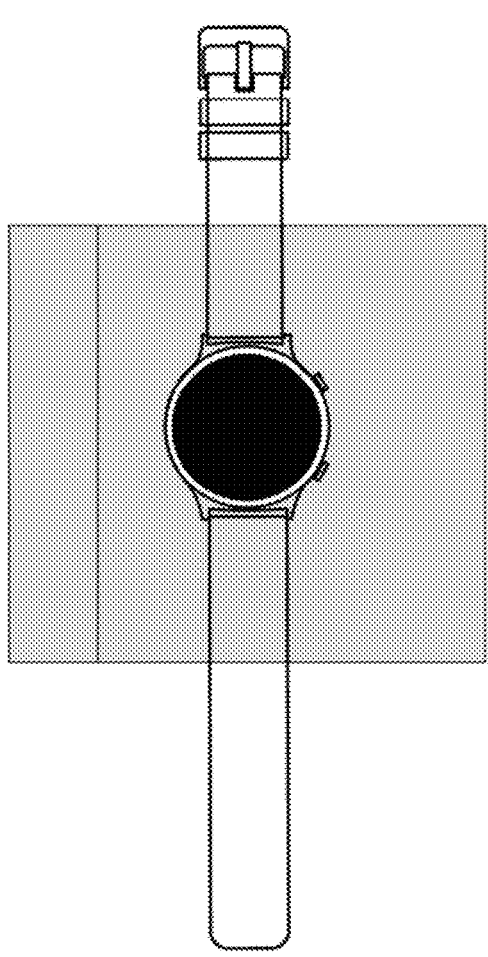
FIG. 19 is a top view of a wireless charging pad that is folded to supply power according to an embodiment of this application.

To reduce an area of the charging pad, the unfolded wireless charging pad shown in FIG. 16 may be folded. For a side view of the folded charging pad, refer to FIG. 18. The folded wireless charging pad may still perform wireless charging on the terminal device. For example, refer to FIG. 19. The folded wireless charging pad performs wireless charging on the watch.

In this embodiment of this application, the plates (for example, the first transmitting plate, the second transmitting plate, and the shield layer) in the wireless charging transmitting apparatus are divided into parts, and the flexible circuit board is used to connect adjacent parts, so that the wireless charging pad can be folded, an area of the wireless transmitting end is reduced, and portability is good.

To be compatible with wireless charging performed through magnetic field coupling, in this embodiment of this application, a transmitting coil and a receiving coil may be further added based on the embodiments described with reference to FIG. 2 to FIG. 19.

Figure 20:
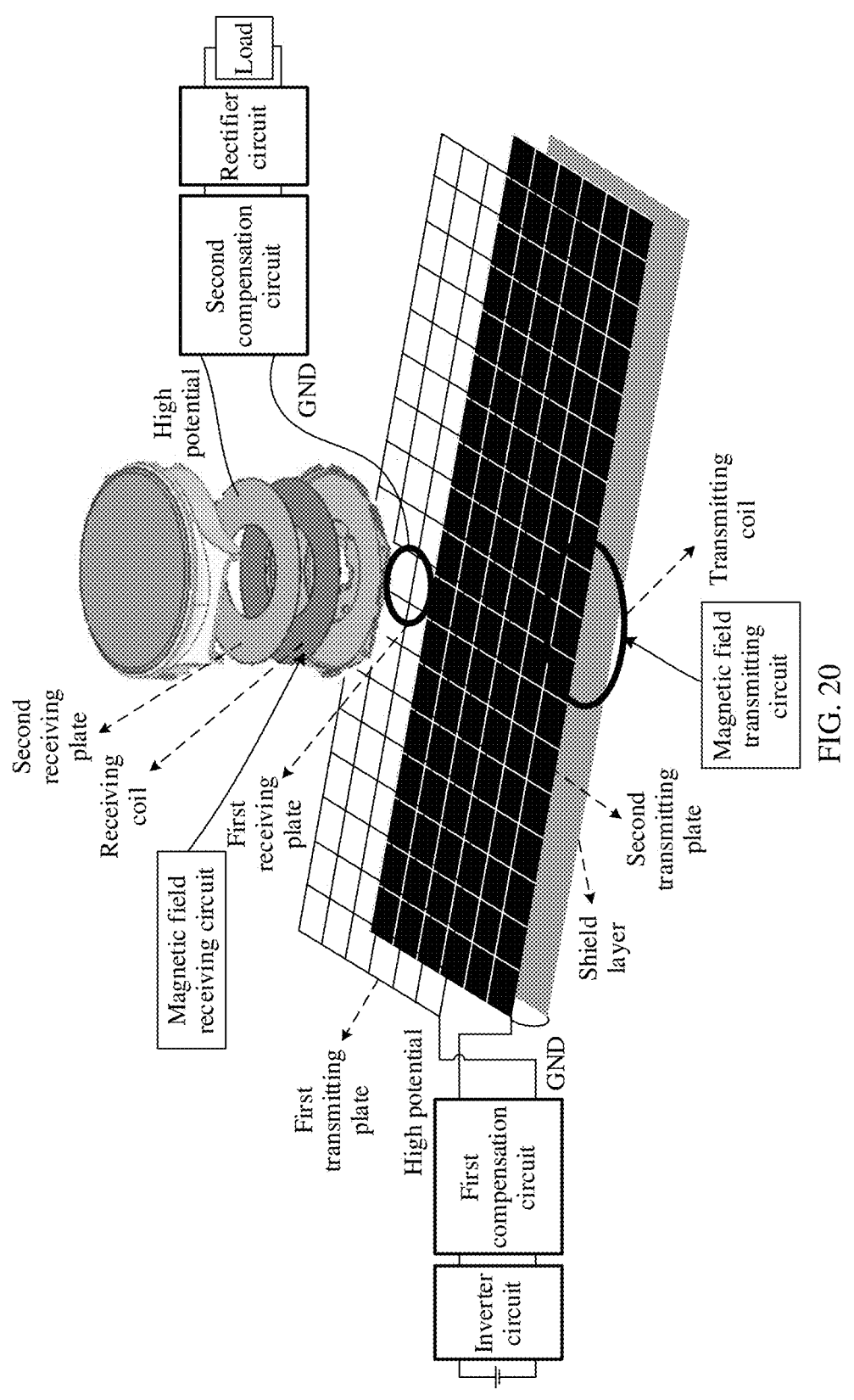
FIG. 20 is another system diagram of a wireless charging system according to an embodiment of this application.

FIG. 20 is another system diagram of a wireless charging system according to an embodiment of this application. As shown in FIG. 20, the wireless charging transmitting apparatus further includes a transmitting coil, the transmitting coil is located between the shield layer and the first transmitting plate, and shield processing may be performed on the transmitting coil, that is, a surface of the transmitting coil may have an electromagnetic shield material. The transmitting coil may generate a high-frequency magnetic field under an action of an alternating current.

Further, the transmitting coil may be specifically disposed between the shield layer and the second transmitting plate, to avoid disposing the transmitting coil between the first transmitting plate and the second transmitting plate, and extending a distance between the second transmitting plate and the second receiving plate. In other words, the transmitting coil is disposed between the shield layer and the second transmitting plate, so that the distance between the second transmitting plate and the second receiving plate can be reduced, and mutual coupling between the second transmitting plate and the second receiving plate can be increased.

In some feasible implementations, the wireless charging transmitting apparatus further includes a magnetic field transmitting circuit. Two ends of the transmitting coil are connected to two ends of the magnetic field transmitting circuit, and the magnetic field transmitting circuit provides an alternating current for the transmitting coil.

Optionally, in some feasible implementations, two ends of the transmitting coil are connected between the first output end of the inverter circuit and the second output end of the inverter circuit (not shown in the figure), that is, the transmitting coil shares the inverter circuit with the first transmitting plate and the second transmitting plate, and the inverter circuit provides an alternating current for the transmitting coil. For example, a switch may be disposed at the output end of the inverter circuit, and the inverter circuit is shared with the first transmitting plate and the second transmitting plate in a form of switching the switch, thereby reducing costs.

The wireless receiving apparatus includes a receiving coil, and shield processing may be performed on the receiving coil, that is, a surface of the receiving coil may have an electromagnetic shield material. The receiving coil is located between the first receiving plate and the second receiving plate. The receiving coil may generate electric energy under an action of the high-frequency magnetic field generated by the transmitting coil.

In some feasible implementations, the wireless receiving apparatus further includes a magnetic field receiving circuit. Two ends of the magnetic field receiving circuit are connected to two ends of the receiving coil, and the magnetic field receiving circuit transmits electric energy generated on the receiving coil to the load.

Optionally, in some feasible implementations, two ends of the receiving coil are connected between the first input end of the rectifier circuit and the second input end of the rectifier circuit (not shown in the figure), that is, the receiving coil shares the rectifier circuit with the first receiving plate and the second receiving plate, and the rectifier circuit transmits the electric energy generated on the receiving coil to the load. For example, a switch may be disposed at the input end of the rectifier circuit, and the rectifier circuit is shared with the first receiving plate and the second receiving plate in a form of switching the switch, thereby reducing costs.

In general, the transmitting coil may generate the high-frequency magnetic field under an action of an alternating current, and the receiving coil generates the electric energy under the high-frequency magnetic field generated by the transmitting coil, thereby implementing electric energy transmission of magnetic field coupling.

Figure 21:
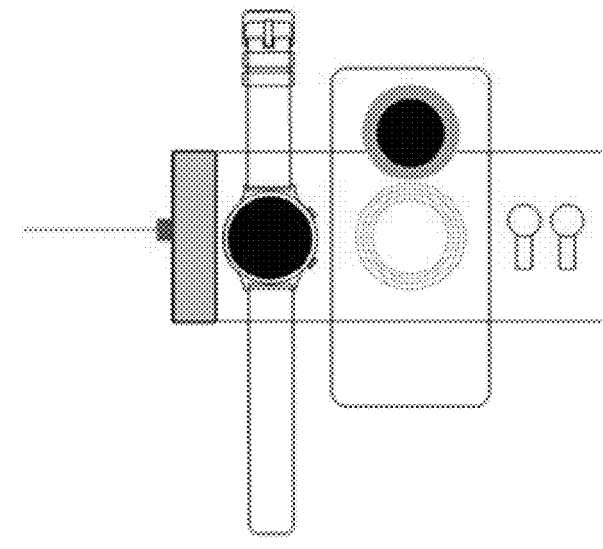
FIG. 21 is another top view of a wireless charging pad that is unfolded to supply power according to an embodiment of this application.

In some feasible implementations, magnetic field coupling and electric field coupling in this embodiment of this application may work simultaneously. FIG. 21 is another top view of a wireless charging pad that is unfolded to supply power according to an embodiment of this application. As shown in FIG. 21, an example in which the wireless charging transmitting apparatus is disposed on the wireless charging pad is used. The wireless charging pad may simultaneously charge a watch, a mobile phone terminal, a headset, and the like. Magnetic field coupling is performed between the mobile phone terminal and the wireless charging pad, and electric field coupling is performed between the watch, the headset, and the wireless charging pad.

Figure 22:
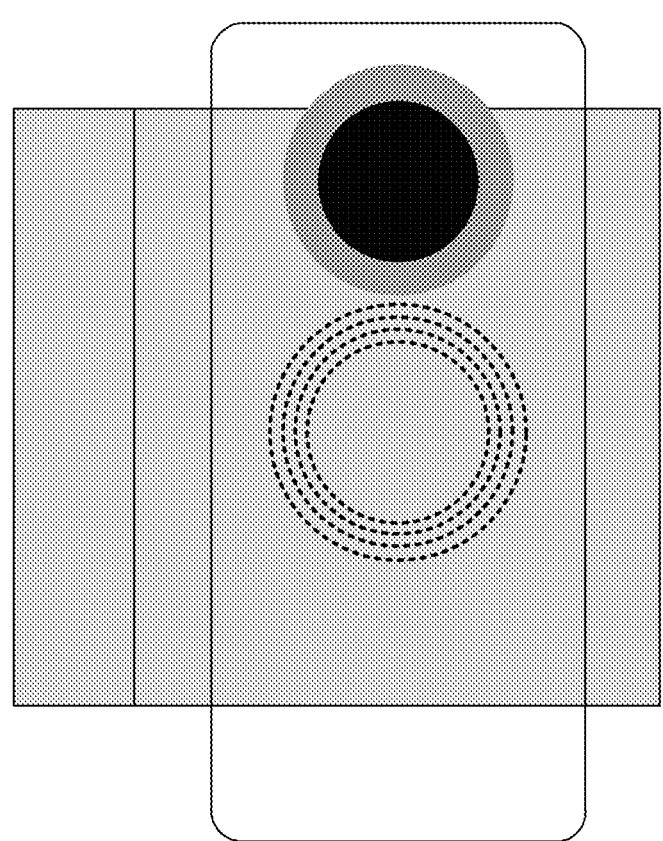
FIG. 22 is a top view of a wireless charging pad that is folded to supply power according to an embodiment of this application.

Optionally, in some feasible implementations, magnetic field coupling and electric field coupling in this embodiment of this application may work separately. FIG. 22 is a top view of a wireless charging pad that is folded to supply power according to an embodiment of this application. As shown in FIG. 22, the transmitting coil in the folded wireless charging pad may perform wireless charging on the mobile phone terminal. Alternatively, the first transmitting plate and the second transmitting plate in the folded wireless charging pad may further perform wireless charging on the watch, the headset, or the like.

In this embodiment of this application, the transmitting coil and the receiving coil are added to the wireless charging system, so that a wireless charging manner of magnetic field coupling can be compatible, and two wireless charging manners of magnetic field coupling and electric field coupling are provided. Therefore, applicability is good.

It should be noted that the terms "first" and "second" are merely intended for a purpose of description, and shall not be understood as an indication or implication of relative importance.

The foregoing descriptions are merely specific implementations, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to and defined by the protection scope of the claims.

What is claimed is:

1. A wireless charging transmitting apparatus comprising:
an inverter circuit,
a first transmitting plate having a first contact disposed thereon and positioned on an accessible surface of the wireless charging transmitting apparatus, wherein the first transmitting plate comprises a mesh structure, the mesh structure comprises a plurality of conducting wires and a plurality of hollow holes enclosed by the plurality of conducting wires, and
a second transmitting plate comprising a plurality of electrode blocks that communicate with each other;
an input end of the inverter circuit is adapted to be connected to a direct current power supply, a first output end of the inverter circuit is connected to the first transmitting plate, and a second output end of the inverter circuit is connected to the second transmitting plate;
the wireless charging transmitting apparatus being further structured so that when the first contact is in contact with a second contact on a first receiving plate in a wireless charging receiving apparatus, the first transmitting plate thereby establishes an electrical connection with the first receiving plate; and
the first transmitting plate and the second transmitting plate are not in contact with each other, and the second transmitting plate is positioned such that it does not contact a second receiving plate in the wireless charging receiving apparatus when the first contact is in contact with the second contact, and each electrode block is configured to perform contactless electric field coupling with the second receiving plate through air;
wherein each electrode block corresponds to a respective hollow hole of the plurality of hollow holes of the first transmitting plate and is accommodated in a projection of the respective hollow hole corresponding to the electrode block into the second transmitting plate.

2. The wireless charging transmitting apparatus according to claim 1, wherein when the first contact is not in contact with the second contact, and the first transmitting plate performs contactless electric field coupling with the first receiving plate through air.

3. The wireless charging transmitting apparatus according to claim 1, wherein a projection of the first transmitting plate in a first direction partially overlaps a projection of the second transmitting plate in the first direction; wherein the first direction is perpendicular to a plane on which the first transmitting plate is located or perpendicular to a plane on which the second transmitting plate is located.

4. The wireless charging transmitting apparatus according to claim 3, wherein the wireless charging transmitting apparatus further comprises a shield layer disposed in a projection region of the second transmitting plate in a second direction, wherein the second direction is opposite to a third direction, and the third direction is a direction in which the second transmitting plate is projected to the second receiving plate.

5. The wireless charging transmitting apparatus according to claim 4, wherein the shield layer comprises a mesh structure, and the shield layer is connected to the first output end of the inverter circuit or the second output end of the inverter circuit.

6. The wireless charging transmitting apparatus according to claim 1, wherein the mesh structure is configured to form no closed loop between the plurality of conducting wires.

7. The wireless charging transmitting apparatus according to claim 1, wherein each electrode block comprises a comb structure.

8. The wireless charging transmitting apparatus according to claim 1, wherein the first transmitting plate comprises n first transmitting sub-plates, each of the first transmitting sub-plates is connected to another adjacent one of the first transmitting sub-plates through a first flexible circuit board, and n is not less than 2; and
the second transmitting plate comprises second transmitting sub-plates corresponding to the first transmitting sub-plates, and each of the second transmitting sub-plates is connected to another adjacent one of the second transmitting sub-plates through a second flexible circuit board.

9. The wireless charging transmitting apparatus according to claim 8, wherein the wireless charging transmitting apparatus further comprises a shield layer comprising shield plates corresponding to the second transmitting sub-plates, and each of the shield plates is connected to another adjacent one of the shield plates through a third flexible circuit.

10. A wireless charging system comprising:
a wireless charging transmitting apparatus, and
a wireless charging receiving apparatus;
wherein
the wireless charging transmitting apparatus comprises an inverter circuit, a first transmitting plate having a first contact disposed thereon and positioned on an accessible surface of the wireless charging apparatus, and a second transmitting plate not in contact with the first transmitting plate;
an input end of the inverter circuit is connectable to a direct current power supply, a first output end of the inverter circuit is connected to the first transmitting plate, and a second output end of the inverter circuit is connected to the second transmitting plate;
the wireless charging system is configured such that when the first contact is in contact with a second contact on a first receiving plate in the wireless charging receiving apparatus, the first transmitting plate establishes an electrical connection to the first receiving plate;
the first transmitting plate comprises a mesh structure comprising a plurality of conducting wires and a plurality of hollow holes enclosed by the plurality of conducting wires, and the second transmitting plate comprises a plurality of electrode blocks that communicate with each other;
the second transmitting plate is positioned such that it does not contact a second receiving plate in the wireless charging receiving apparatus when the first contact is in contact with the second contact, and each electrode block is configured to perform contactless electric field coupling with the second receiving plate through air; and
each electrode block corresponds to a respective hollow hole of the plurality of hollow holes of the first transmitting plate and is accommodated in a projection of the respective hollow hole corresponding to the electrode block into the second transmitting plate; and
the wireless charging receiving apparatus comprises the first receiving plate having the second contact thereon, the second receiving plate not in contact with the first receiving plate, and a rectifier circuit;
the first receiving plate is connected to a first input end of the rectifier circuit, the second receiving plate is connected to a second input end of the rectifier circuit, and an output end of the rectifier circuit is connected to a load;

the wireless charging system is further configured such that when the second contact is in contact with the first contact on the first transmitting plate in the wireless charging transmitting apparatus, the first receiving plate establishes the electrical connection to the first transmitting plate; and the second receiving plate is configured to perform contactless electric field coupling with the second transmitting plate in the wireless charging transmitting apparatus through air.

11. The wireless charging system according to claim 10, wherein when the first contact is not in contact with the second contact on the first receiving plate, the first transmitting plate performs contactless electric field coupling with the first receiving plate through air.

12. The wireless charging system according to claim 10, wherein a projection of the first transmitting plate in a first direction partially overlaps a projection of the second transmitting plate in the first direction; wherein the first direction is perpendicular to a plane on which the first transmitting plate is located or perpendicular to a plane on which the second transmitting plate is located.

13. The wireless charging system according to claim 12, wherein the wireless charging transmitting apparatus further comprises a shield layer disposed in a projection region of the second transmitting plate in a second direction, wherein the second direction is opposite to a third direction, and the third direction is a direction in which the second transmitting plate is projected to the second receiving plate.

14. The wireless charging system according to claim 13, wherein the shield layer comprises a mesh structure, and the shield layer is connected to the first output end of the inverter circuit or the second output end of the inverter circuit.

15. The wireless charging system according to claim 10, wherein the mesh structure is configured to form no closed loop between the plurality of conducting wires.

16. The wireless charging system according to claim 10, wherein each electrode block comprises a comb structure.

17. The wireless charging system according to claim 10, wherein the first transmitting plate comprises n first transmitting sub-plates, each of the first transmitting sub-plates is connected to another adjacent one of the first transmitting sub-plates through a first flexible circuit board, and n is not less than 2; and the second transmitting plate comprises second transmitting sub-plates corresponding to the first transmitting sub-plates, and each of the second transmitting sub-plates is connected to another adjacent one of the second transmitting sub-plates through a second flexible circuit board.

18. The wireless charging system according to claim 17, wherein the wireless charging transmitting apparatus further comprises a shield layer comprising shield plates corresponding to the second transmitting sub-plates, and each of the shield plates is connected to another adjacent one of the shield plates through a third flexible circuit.

* * * * *